(12) United States Patent
Fermann et al.

(10) Patent No.: US 7,782,910 B2
(45) Date of Patent: Aug. 24, 2010

(54) SINGLE-POLARIZATION HIGH POWER FIBER LASERS AND AMPLIFIERS

(75) Inventors: Martin Fermann, Franklin, MA (US); Donald J. Harter, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 248 days.

(21) Appl. No.: 11/109,711

(22) Filed: Apr. 20, 2005

(65) Prior Publication Data
US 2005/0232313 A1 Oct. 20, 2005

Related U.S. Application Data

(62) Division of application No. 09/809,248, filed on Mar. 16, 2001, now Pat. No. 6,954,575.

(51) Int. Cl.
*H01S 3/30* (2006.01)
(52) U.S. Cl. ............................ 372/6; 372/18; 372/30
(58) Field of Classification Search .............. 372/6, 372/18
See application file for complete search history.

(56) References Cited

U.S. PATENT DOCUMENTS

| | | | |
|---|---|---|---|
| 4,558,921 A | | 12/1985 | Hasegawa |
| 5,473,458 A | | 12/1995 | Mamyshev |
| 5,617,434 A | * | 4/1997 | Tamura et al. .............. 372/6 |
| 5,627,848 A | * | 5/1997 | Fermann et al. ............ 372/18 |
| 5,790,722 A | * | 8/1998 | Minden et al. .............. 385/27 |
| 5,880,877 A | | 3/1999 | Fermann |
| 5,923,686 A | * | 7/1999 | Fermann et al. ............ 372/18 |
| 6,288,659 B1 | * | 9/2001 | Jalali et al. .............. 341/137 |
| 6,570,892 B1 | * | 5/2003 | Lin et al. .................. 372/6 |
| 6,804,471 B1 | * | 10/2004 | Ionov et al. ............... 398/187 |

(Continued)

FOREIGN PATENT DOCUMENTS

EP 0622916 A1 11/2004

(Continued)

OTHER PUBLICATIONS

Mark et al., Diode-pumped passively mode-locked Nd3+doped fluoride fiber laser emitting at 1.05um: Novel results, 1998.*

(Continued)

*Primary Examiner*—Dung T Nguyen
(74) *Attorney, Agent, or Firm*—Sughrue Mion, PLLC

(57) ABSTRACT

A novel polarization maintaining optical fiber, which can be used as a high-power polarization maintaining fiber laser or amplifier, is described. Insensitivity of the polarization state to external fiber bending and temperature changes is accomplished by minimizing polarization mode-coupling via reducing stresses inside the fiber core via increasing the fiber diameter. Alternatively, polarization mode-coupling can be minimized by an optimization of the fiber coating to minimize stresses at the interface between the fiber and the coating. As a result insensitivity to polarization mode-coupling is obtained at greatly reduced values of birefringence compared to small-diameter fibers. The fiber is of significant use in any application where polarization stability is important, and will be useful in telecommunications applications in particular for reducing polarization mode dispersion. An implementation in a parabolic pulse-producing fiber laser is also described as one specific high power example.

49 Claims, 11 Drawing Sheets

U.S. PATENT DOCUMENTS

| | | | |
|---|---|---|---|
| 6,885,683 | B1 * | 4/2005 | Fermann et al. ............... 372/25 |
| 2003/0059185 | A1 * | 3/2003 | Russell et al. ............... 385/125 |
| 2004/0017833 | A1 * | 1/2004 | Cundiff et al. ............... 372/18 |
| 2004/0105641 | A1 * | 6/2004 | Russell et al. ............... 385/125 |

FOREIGN PATENT DOCUMENTS

| | | | |
|---|---|---|---|
| JP | 01-260405 | A | 10/1989 |
| JP | 04-357892 | A | 12/1992 |
| JP | 05-63258 | A | 3/1993 |
| JP | 05-75194 | A | 3/1993 |
| JP | 08-51246 | A | 2/1996 |
| JP | 96-070151 | A | 3/1996 |
| JP | 08-213680 | A | 8/1996 |
| JP | 09-139536 | A | 5/1997 |
| JP | 09-167869 | A | 6/1997 |
| JP | 09-318832 | A | 12/1997 |
| JP | 10-93177 | A | 4/1998 |
| JP | 2000-187108 | A | 7/2000 |
| JP | 2000-200931 | A | 7/2000 |
| JP | 2000-356719 | A | 12/2000 |
| JP | 2002-323636 | A | 11/2002 |
| WO | 00/60388 | A1 | 10/2000 |
| WO | 00/60390 | A1 | 10/2000 |

OTHER PUBLICATIONS

F.X. Kartner et al, "Stabilization of Solitonlike Pulses with a Slow Saturable Absorber", Optics Letters, vol. 20, No. 1, Jan. 1, 1995, pp. 16-18.

E.A. DeSouza et al, "Saturable Absorber Modelocked Polarisation Maintaining Erbium-Doped Fibre Laser", Electronics Letters, vol. 29, No. 5, Mar. 4, 1993, pp. 447-449.

M. Wgmuller, et al "Diode-Pumped Passively Mode-Locked Nd3+- Doped Fluoride Fiber Laser Emitting at 1.05 um: Novel Results", IEEE Journal, vol. 34, No. 1, Jan. 1998, pp. 14-23.

V.I. Kruglov, et al "Self-Similar Propagation and Amplification of Parabolic Pulses in Optical Fibers", Physical Review Letters, vol. 84, No. 26, pp. 6010-6013.

FX Kartner et al.; "Stabilizatin of solitonlike pulses with a slow saturable absorber", Optics Letters, vol. 20, No. 1, pp. 16-18, Jan. 1, 1995.

A. Apolonski et al.; "Controlling the Phase Evolution of Few-Cycle Light Pulses", Phys. Rev. Lett. 85, 740-743 (2000).

D. Anderson et al.; "Wave-breaking-free pulses in nonlinear-optical fibers", JOSA B, vol. 10, Iss. 7, pp. 1185-1190 (1993).

J. K. Ranka et al.; "Visible continuum generation in air-silica microstructure optical fibers with anomalous dispersion at 800 nm", J. K. Ranka, R. S. Windeler, and A. J. Stentz, Opt. Lett. 25, 25-27 (2000).

J. K. Ranka et al.; "Optical properties of high-delta air silica microstructure optical fibers", Opt. Lett. 25, 796-798 (2000).

DE10 196 162.6 Office Action from Jul. 14, 2009.

Nakazawa et al.,"Ultrahigh-speed Long-Distance TDM and @DM Soliton Tranmission Technologies", IEEE J Selected Topics in Quantum Electronics, vol. 6 No. 2 Mar./Apr. 2000 p. 363.

* cited by examiner

> 125μm

SINGLE-POLARIZATION HIGH POWER FIBER LASERS AND AMPLIFIERS

This is a divisional of application Ser. No. 09/809,248 filed Mar. 16, 2001 now U.S. Pat. No. 6,954,575.

FIELD AND GENERAL DESCRIPTION OF THE INVENTION

The invention relates to single polarization optical fibers, i.e., optical fibers provided with a strong polarization-holding or polarization-maintaining quality; and to fiber lasers formed from rare-earth doped versions of the same.

According to the invention, a novel polarization-maintaining optical fiber is produced by a variety of alternative techniques. According to one embodiment, the fiber is made polarization-insensitive to external bending and temperature change by increasing the fiber diameter to minimize polarization mode coupling through the reduction of stress inside the fiber core. Alternatively, the polarization mode coupling can be reduced by utilizing specific cladding techniques to minimize stresses at the fiber-cladding interface. Stress inducing techniques may be employed within the cladding in order to optimize fiber birefringence.

Rare-earth-doped multi-clad versions of such polarization-maintaining fibers are ideal as high power laser sources, allowing efficient pumping with high power laser diodes. The fiber lasers can operate both in a continuous wave mode or in a pulsed mode and offer significant advantages in fiber laser and amplifier design wherever polarization stability is a major concern. Particularly useful applications of such fibers comprise high-power single-frequency fiber amplifiers, high-power pulsed fiber amplifiers or mode-locked fiber lasers.

The nonlinearity of these devices can be minimized while retaining good polarization holding properties by incorporating a circular inner cladding surrounding the fiber core. The inner cladding provides for non-uniform pump absorption along the fiber length in an end-pumped amplifier configuration, producing large pump absorption in a first short section of the fiber and reduced pump absorption in a second long section of the fiber. As a result, the gain in the first short fiber section is maximized, in turn minimizing the nonlinearity of the fiber. The effectiveness of non-uniform pump absorption can further be maximized by allowing for the central core to be multi-mode, which increases the core diameter and the diameter of the inner cladding, increasing the capture fraction for any pump light coupled into the first inner cladding.

An inner core can be grown directly during the preform manufacturing process by adding a raised level of phosphorous, germanium- or aluminum dopants. The circular inner cladding can be formed from a reduced concentration doping region of the perform. A second undoped region of the preform can then constitute a second outer cladding. The circular inner cladding can also be produced by over-sleaving the preform with an appropriate substrate tube of a lower refractive index compared to the inner cladding. The additional substrate tube then comprises an outer $2^{nd}$ cladding. Generally, the outside shape of this $2^{nd}$ cladding can be non-circular or non-uniform to provide for overall efficient absorption of the pump light.

Efficient pump absorption can also be obtained by implementing a single non-circular cladding in conjunction with an outside coating, where the refractive index of the coating is lower than the refractive index of the cladding. Specifically, the non-circular cladding may have an outer perimeter which forms a non-diametrically-symmetric equilateral polygon, including for example a pentagon or a heptagon. Alternatively, the non-circular cladding may have an outer perimeter which forms a non-diametrically symmetric non-equilateral polygon, including for example a hexagon or an octagon with one or more shortened sides. Such shapes randomize the reflections within the cladding, and thereby promote mode-mixing within the cladding, while not reinforcing reflections at regular periodic time and distance intervals.

Within this cladding structure circular or non-circular stress producing regions can further be incorporated into such fibers to obtain polarization maintaining operation.

In the case of mode-locked fiber lasers, polarization stable operation can be obtained in intermediate birefringence fiber, i.e. in a regime where the group velocity walk-off between the two polarization axes of the fiber is small compared to the pulse width, greatly enhancing the pulse stability. As a result particularly compact polarization insensitive passively modelocked fiber lasers can be constructed by the implementation of saturable absorbers into the fiber laser cavity.

Polarization-stable operation of modelocked lasers can also be obtained in single polarization fiber cavities containing sections of high birefringence fiber, where the group-velocity walk-off between the two polarization axes in each fiber section is large compared to the pulse width. In this case pulse stability is ensured when the major carrier life-time of the saturable absorber is smaller than the group-velocity walk-off time in each high birefringence fiber section.

More generally, in the presence of stray reflections in a passively modelocked laser cavity, pulse stability can be ensured when the time delay between the main pulse and the 'stray' pulse generated by the stray reflection is longer than the life-time of the intra-cavity saturable absorber. For the case of a passively modelocked multi-mode fiber laser, pulse stability is obtained when the group-velocity walk-off time between the fundamental and the next higher-order mode is longer than the life-time of the intra-cavity saturable absorber.

Even more generally, by employing saturable absorbers with at least one life-time comparable to the intra-cavity pulse width and an intra-cavity filter, high-power operation of passively modelocked fiber lasers with chirped pulses can be obtained. Chirped pulses have a reduced peak power and extended temporal width. At the output of the fiber laser, the pulses can be temporally recompressed to the bandwidth limit with a greatly increased peak power and greatly reduced temporal width. Laser stability requires the dispersion of the intra-cavity fiber to be positive and the intra-cavity filter should have a bandwidth less than the bandwidth of the gain medium. The major life-time of the saturable absorber needs to be shorter than around 5 times the maximum intra-cavity pulse width; and the saturable absorber needs to be operated at least 2 times above saturation (the pulse energy impinging on the saturable absorber has to be at least twice higher than the saturation energy of the saturable absorber). The stable oscillation of chirped and recompressible pulses in such a laser is characterized by a large value of intra-cavity self-phase modulation, which readily exceeds $\pi$. As a result, the optical bandwidth of the generated pulses exceeds the bandwidth of the intra-cavity filter. The intra-cavity pulse shape thence cannot be approximated with a soliton or a gaussian shape but rather resembles a parabola, or generally, a pulse with greatly reduced pulse wings compared to a gaussian pulse.

This cavity design is also compatible with intermediate-birefringence low polarization mode-coupling fiber designs and the use of multi-mode fibers to further increase the output power.

BACKGROUND OF THE INVENTION

The development of advanced optical technology over the last few years has greatly favored the implementation of fiber lasers as a generic replacement of conventional solid state lasers. Compared to solid state lasers, fiber lasers offer unique potential for integration and miniaturization without any compromise in performance, allowing the implementation of complex laser processing functions in real-world applications that have previously not been accessible to solid-state lasers.

One of the most important aspects in these advancements has been the implementation of double-clad fiber amplifier designs, which enable pumping of the fiber lasers with widely power-scalable diode lasers providing for fiber laser output powers up to the 100 W range in continuous wave operation (V. Dominic et al. '110 W fiber laser', Conf. on Lasers and Electro-Optics, CLEO, 1999, paper, CPD11).

However, these high output powers have to date only been obtained with randomly polarized output beams, which is in contrast to solid-state lasers, where the generation of output beams with a well-defined polarization state poses no serious difficulty. Clearly for fiber lasers or specifically double-clad fiber lasers to fully replace solid state lasers, the construction of fiber lasers with a controllable polarization output state is sought.

Previously, several methods have been proposed to enable well-defined polarization states to be generated from double-clad fiber lasers. In one work, the use of highly-birefringent amplifier fibers via the use of elliptical fiber cores or the incorporation of stress-producing regions into the fiber cladding was suggested: (M. E. Fermann et al., 'Single-mode amplifiers and compressors', U.S. Pat. No. 5,818,630; M. E. Fermann et al., 'Technique for mode-locking of multi-mode fibers and the construction of compact high-power fiber laser pulse sources', U.S. application Ser. No. 09/199,728, filed Nov. 25, 1998, both of which are incorporated by reference herein. The incorporation of stress-producing regions into double clad fibers has later been reiterated by DiGiovanni, in U.S. Pat. No. 5,949,941. However, DiGiovanni, specifies the use of non-circular stress producing regions inside an asymmetrically-shaped outside cladding. Non-circular stress producing regions are generally difficult to manufacture, and an asymmetrical cladding shape greatly impairs the possibility of cleaving such fibers and the ability to splice such fibers to other circular fibers.

Recently, a polarization maintaining fiber amplifier has been demonstrated by Kliner et al., (D. A. V. Kliner et al., 'Polarization maintaining amplifier employing double-clad bow-tie fiber', Opt. Lett., Vol. 26., pp. 184-186 (2001)). In the later work by Kliner et al. a specific implementation of the design suggestion by Fermann et al. in the '630 patent was discussed. Kliner et al. implemented a fiber with a cladding diameter of 150 µm, where the stress producing regions were spanning an inner diameter of 20 µm, implying that the stress producing regions were very close to the core to maximize the fiber birefringence. In this work a birefringence as high as $1.2 \times 10^{-4}$ (corresponding to a beat length of 8 mm at a wavelength of 1000 nm) was required to obtain the polarization maintaining operation. Moreover, only two stress producing regions were incorporated into the cladding and the double clad fiber comprised only a circular glass fiber cladding and a circular polymer cladding.

The use of such stress producing regions as discussed by Kliner et al. in double-clad fibers is problematic, however, because of the increased complexity of the fiber preform and the tendency of highly stressed preforms to shatter whenever machining of the preform surface is required. One example of this is the rectangularly-shaped cladding (see, Snitzer et al, 'Optical fiber lasers and amplifiers, U.S. Pat. No. 4,815,079) used to maximize the absorption. However, stress producing regions can have the beneficial effect of perturbing the modes propagating in the cladding, leading to increased pump absorption.

In the following we refer to the modes propagating in the cladding as pump modes. In order to maximize the mode perturbation of the pump modes and to optimize pump absorption, stress producing regions close to the outer diameter of the fiber are optimum. In turn, stress producing regions far away from the fiber core produce smaller amounts of birefringence and reduce the polarization holding ability of the fiber. Generally, the requirements for optimum pump mode perturbation and optimum polarization holding are different and a technique for obtaining good polarization holding in the presence of optimum pump mode perturbation has not been described.

Similarly, the use of an elliptical core generally does not always produce enough birefringence in order to provide for a stable polarization state. Moreover, the amount of birefringence induced by the use of an elliptical fiber core decreases with an increase in fundamental mode size; whereas a large fundamental mode size is preferable for high-power applications.

In yet another proposal, asymmetric air holes (A. Ortigossa et al., 'Highly birefringent photonic crystal fibers', Opt. Lett., 25, 1325-1327 (2000)) have been used to obtain a polarization maintaining effect. However, these designs were only used with respect to an outside fiber diameter of 63 µm. Hence a polarization beatlength of <1 mm was required at a wavelength of 1.54 µm to obtain polarization stable operation. No optimization of the outside fiber diameter or the fiber coating or the use of such fibers as polarization maintaining fiber amplifiers was described.

As an alternative approach to generate a polarization stable output, the use of controlled coiling of the fiber onto a small drum has been suggested (M. E. Fermann et al., 'Integrated passively modelocked fiber lasers and method for constructing the same, U.S. Pat. No. 6,072,811; Koplow et al. 'Polarization maintaining double-clad fiber amplifier employing externally applied stress-induced birefringence', Opt. Lett., vol. 25, pp. 387 (2000)). However, tight coiling is also problematic since it reduces the life-time of the fiber. Because of life-time issues controlled bending is limited to fibers with small outside diameters (≈<200 µm). Clearly, tightly coiled fibers do not allow for fiber delivery of the signal via a fiber lead of extended length. Moreover to generate truly high-power fiber lasers, the use of larger diameter fibers is clearly an advantage as it allows the coupling of more pump power from semiconductor lasers into the fiber.

To simplify modal control inside the fiber core and to reduce mode-coupling inside the core in optical fibers, the use of large outer diameter fibers has previously been suggested (M. E. Fermann and D. Harter, 'Single-mode amplifiers and compressors based on multi-mode optical fibers', U.S. Pat. No. 5,818,630). A limitation of this approach is that the threshold of typical fiber lasers and amplifiers is directly proportional to the pump intensity. Thus, a larger outside fiber diameter generally means a higher threshold of the fiber amplifier or laser in question, and less efficient operation.

An alternative suggested method for reducing mode-coupling inside the fiber core is to implement two types of coatings. The primary coating surrounding the glass surface of the fiber was suggested to be a soft coating with a correspondingly decreased Young's modulus and a small Poisson ratio. A secondary hard coating was suggested to then protect the fiber from the outside, where the secondary coating had an increased Young's modulus and a large Poisson ratio (S. T. Shiue, 'Design of double-coated optical fibers to minimize long-term hydrostatic pressure-induced microbending losses', Opt. Lett., 26, 128-130 (2001)). However, rare-earth-doping of such fibers was not considered, moreover, no coating designs for optimization of the polarization holding ability of the fibers were given.

Generally, none of the previous methods suggest any method for minimizing the amount of polarization mode-coupling in a birefringent fiber. To date the only technique available for reducing the amount of polarization mode-coupling in a birefringent fiber has been a maximization of the fiber birefringence. In contrast we disclose here the use of a large fiber diameter or an optimized fiber coating to reduce the amount of polarization mode-coupling and polarization mode dispersion, and to increase the polarization holding ability of optical fibers at small values of birefringence. Moreover, we disclose improving the efficiency of a polarization-maintaining large outside diameter fiber amplifier or laser, by the addition of an outside glass cladding to a relatively smaller inner circular cladding, such that the pump light is guided inside the inner cladding while the large outside cladding ensures a reduction of mode-coupling inside the fiber core. A similar improvement in efficiency of a polarization maintaining optical fiber can be obtaining by using a relatively small fiber cladding diameter, in conjunction with optimized fiber coatings.

To minimize the nonlinearity of high-power fiber amplifiers, the use of multi-mode fiber amplifiers has been suggested (see, U.S. Pat. No. 5,818,630; and M. E. Fermann et al., U.S. Pat. No. 5,880,877). In both these patents the use of polarization maintaining fiber and double-clad fiber has been suggested. In the '877 patent, herein incorporated by reference, the use of an inner cladding surrounding the fiber core has also been suggested. However, these patents did not suggest a method for minimizing the nonlinearity of high-power fiber amplifiers by controlling the cladding shape.

Cladding shapes are generally optimized to produce a uniform pump absorption coefficient along the fiber length (see, Snitzer et al., in U.S. Pat. No. 4,815,079; Martin H. Muendel et al., U.S. Pat. No. 5,533,163; D. J. DiGiovanni et al., U.S. Pat. No. 5,966,491 and; S. Grubb et al., U.S. Pat. No. 6,157,763). In Snitzer et al., a rectangular cladding with a single-mode core has been suggested, in Muendel et al., a polygon that tiles a plane has been suggested for a cladding shape, and in Grubb et al., two perpendicular planes at the outside of the inner fiber cladding provide uniform pump absorption. In D. J. DiGiovanni et al., a triple cladding provides uniform pump absorption, where the first cladding has an asymmetrical shape, the second cladding is round and the third cladding material is a polymer coating material. In addition DiGiovanni also suggests the implementation of non-circular stress-producing regions into the first cladding.

None of these patents suggests the use of symmetrical cladding shapes such as a pentagon, a heptagon or a distorted hexagon to optimize the pump absorption inside the cladding or to enable straightforward splicing of such fibers. Moreover, DiGiovanni does not suggest the use of circular stress-producing regions inside a cladding.

Moreover, none of these reference patents suggest a circular inner cladding to provide for a non-uniform pump absorption coefficient. Equally, none of these patents suggest a multi-mode core with a circular inner cladding to provide for non-uniform pump absorption.

In the realm of modelocked fiber lasers several techniques have been suggested to obtain stable operation in the presence of sections of highly birefringent fiber. In one approach, the introduction of a polarization dependent loss has been suggested to obtain reliable operation along one polarization axis (M. E. Fermann et al., U.S. Pat. No. 5,627,848; see also H. Lin et al., U.S. Pat. No. 6,097,741 for a similar teaching; along with M. E. Fermann et al., U.S. Pat. No. 6,072,811). In the early '848 patent the use of wavelength tuning elements such as filters or bulk gratings has also been suggested. However, no fiber designs were disclosed in these reference patents which allow stable operation of modelocked lasers containing fiber sections of intermediate birefringence fiber. In the '811 patent to Fermann, it was suggested that stable modelocked operation requires highly birefringent fiber sections with a polarization beat length <10 cm at a wavelength of 1.55 $\mu$m. In the example discussed therein, a beat length of <4 mm at 1.55 $\mu$m was used to obtain polarization stable operation. Further, none of the three above mentioned patents describes specific saturable absorber designs that provide pulse stability in a fiber laser containing several sections of highly birefringent fiber.

In modelocked fiber lasers, several techniques have similarly been suggested to increase the obtainable output power. The use of fibers with different values of dispersion in conjunction with a (non-desirable) highly polarization sensitive cavity has been described (Tamura et al., 'Stretched pulse fiber laser, U.S. Pat. No. 5,513,194). Another technique suggests the use of highly chirped fiber gratings to operate the system with large values of negative (soliton-supporting) dispersion (see, M. E. Fermann et al., 'Technique for the generation of high power optical pulses in modelocked lasers by dispersive control of the oscillation pulse width', U.S. Pat. No. 5,450,427). The disadvantage of the use of highly chirped fiber gratings is that the generated pulse length increases proportionally to the square root of the total induced negative dispersion, which clearly does not help in producing the shortest possible pulses.

Finally, another method relies on the use of multi-mode fibers (M. E. Fermann, U.S. application Ser. No. 09/199,728, filed Nov. 25, 1998) for an increase in fundamental mode size and an increase in possible output oscillator power. However, the use of non-uniform pump absorption was not suggested in this connection. Moreover, no specific saturable absorber design was suggested for optimizing the stability of such a laser, and no specific fiber design for optimizing laser stability in the absence of polarization compensating elements was suggested.

Moreover, all modelocking techniques demonstrated to date (for example, Fermann et al., U.S. Pat. No. 6,072,811; Lin et al., U.S. Pat. No. 6,097,741; Tamura et al., U.S. Pat. No. 5,513,194; Fermann et al., U.S. Pat. No. 5,450,427; Fermann et al., U.S. application Ser. No. 09/199,728), just to name a few examples, are limited as they only allow a maximum amount of self-phase modulation of around $\pi$ inside the cavity. Since the amount of self-phase modulation inside a laser cavity is directly proportional to the peak power of the optical pulses generated, the small amount of tolerable self-phase modulation is clearly a limiting factor. Another common feature of such laser systems, due to the small amount of self-phase modulation, is that the oscillating spectral pulse bandwidth is smaller than the bandwidth of any intra-cavity optical filter (see, K. Tamura et al., 'Optimization of filtering in soliton fiber lasers', IEEE Photonics Techn. Lett., 6, 1433-1435, (1994)). No specific saturable absorber designs have been suggested that enable operation of the laser in the presence of large amounts of self-phase modulation, when the optical pulse bandwidth is larger than the bandwidth limitation of any intra-cavity optics.

Outside the realm of modelocked lasers, the use of parabolic pulses has been suggested to increase the available output power from fiber amplifiers (M. E. Fermann et al., 'Modular, wavelength-tunable, high-energy ultrashort pulse fiber source, U.S. application Ser. No. 09/576,772, filed May 23, 2000. However, the use of parabolic pulses has not been suggested in a fiber oscillator, moreover no method for the effective use of parabolic pulses for optimization of the output power of a modelocked fiber oscillator has been suggested to date. Moreover, it has not been suggested that parabolic pulses allow the construction of modelocked fiber lasers with an amount of intra-cavity self-phase modulation $>\pi$, resulting in a bandwidth of the optical output pulses larger than the bandwidth limitation of any intra-cavity bandwidth limiting optics.

SUMMARY OF THE INVENTION

The invention relates to a novel polarization-maintaining optical fiber. In this fiber, polarization mode-coupling and polarization mode dispersion are minimized by a number of techniques, specifically by reducing fiber core stresses via an increase in the fiber diameter. As a result, a much smaller degree of mode-coupling and mode-dispersion are obtained compared to small-diameter fibers. Generally, stress producing regions can be incorporated into such fibers to optimize their polarization holding operation. These stress producing regions can be circular in shape.

By rare-earth-doping such fibers, high power well-polarized fiber lasers and amplifiers may be constructed without polarization compensating elements. The laser or amplifier threshold and the efficiencies of such fiber lasers can be optimized by using a small inner cladding diameter in conjunction with at least one 'soft' and one 'hard' coating layer, where the primary coating is 'soft' and the secondary 'hard' coating has an extended diameter.

The laser or amplifier threshold can also be minimized by implementing non-circular, symmetrical cladding shapes that do not tile a plane, such as a pentagon, heptagon, or a distorted hexagon.

Both continuous wave, pulsed, or modelocked operation of such fiber lasers and amplifiers is possible. The nonlinearity of such fiber lasers can be minimized by providing for non-uniform pump absorption, by adding a small circular inner cladding surrounding the fiber core. The reduced absorption of helical rays in such a cladding structure provides for a decrease of pump absorption along the fiber length. As a result, a large gain is only produced in a short section of fiber with high pump absorption. The overall efficiency of the device can be ensured by limiting the size of the inner cladding with respect to the fiber core size. Large amounts of pump light can be coupled into the inner cladding when a multi-mode core is employed.

When fiber lasers operate in a modelocked mode, polarization-stable operation can be obtained in intermediate birefringence fiber. In this case it is ensured that polarization walk-off between the two polarization eigenmodes of the fiber is small compared to the generated pulse width.

In fibers of arbitrary diameter, polarization-stable modelocked operation is possible in fiber cavities containing sections of high birefringence fiber. Passive modelocking is enabled by the incorporation of a saturable absorber into the cavity. Modelocking stability is ensured when the life-time of the saturable absorber is smaller than the single-pass group delay between the polarization eigenmodes in each of the fiber sections.

More generally, in the presence of stray reflections in a passively modelocked laser cavity, pulse stability can be ensured when the time delay between the main pulse and the 'stray' pulse generated by the stray reflection is longer than the life-time of the intra-cavity saturable absorber. Specifically, a stable passively modelocked multi-mode fiber laser is constructed when the life-time of the saturable absorber is shorter than the single-pass group delay between the first and the next higher-order mode inside the fiber.

As an alternative, a high-power fiber laser can be constructed using positive dispersion rare-earth-doped amplifier fiber and a narrow bandpass filter as well as a strongly absorbing saturable absorber. In this condition the formation of pulses inside the oscillator that closely approximate parabolas (in the following, to be referred to as parabolic pulses) can be stable, allowing for a great increase in self-phase modulation inside the oscillator, in turn enabling a great increase in power compared to oscillators based on gaussian or $sech^2$-shaped pulses. Such a cavity design is also compatible with intermediate-birefringence low polarization mode-coupling fiber designs and the use of multi-mode fibers to further increase the output power. The formation of high-energy parabolic pulses inside a fiber laser oscillator is generally characterized by an optical pulse bandwidth, which is larger than the bandwidth of the intra-cavity gain medium or the intra-cavity filter bandwidth. Moreover, stability of high-energy parabolic pulses inside an oscillator is ensured when the saturable absorber life-time is shorter than around 5 times the maximum pulse width inside the oscillator. The stability of the oscillator is further enhanced by operating the saturable absorber in deep saturation, i.e., by providing for a pulse energy impinging onto the absorber which is at least twice the saturation energy. An optimum location of the saturable absorber is behind the intra-cavity filter, where both of these elements are located at the output end of the cavity. The addition of partial dispersion compensation via intra-cavity dispersive elements further enhances pulse stability. These dispersive elements are ideally placed in front of the saturable absorber. The linear loss of the saturable absorber can further be increased by heating the saturable absorber optically, utilizing optical absorption of the light impinging onto the absorber.

BRIEF DESCRIPTION OF THE DRAWING FIGURES

FIG. 1 schematically illustrates a large diameter polarization-maintaining fiber according to the invention;

FIG. 3b illustrates the gain profile of the fiber laser of FIG. 3a;

Figure 11:
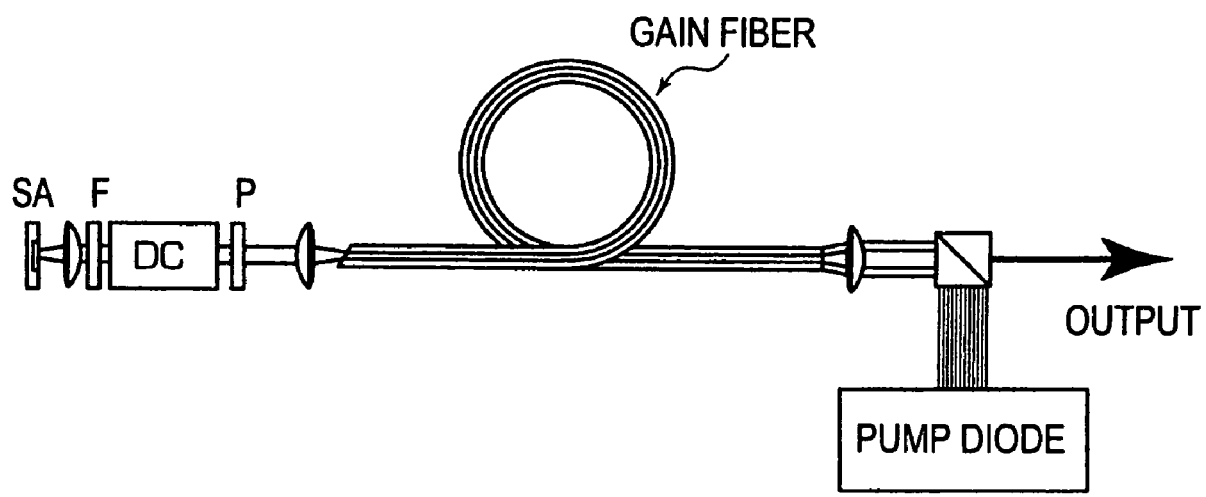
FIG. 11 illustrates an end-pumped mode-locked fiber laser with dispersion compensation.
Figure 14:
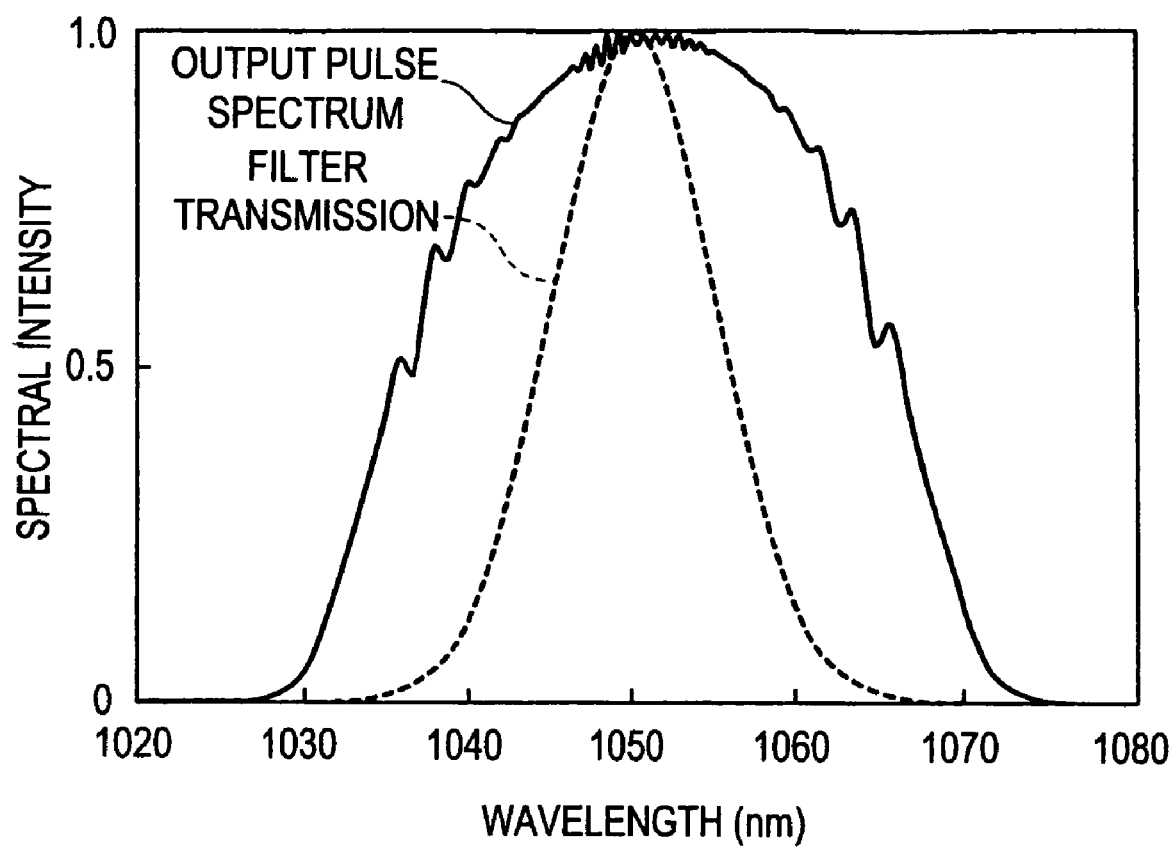
Figure 15:
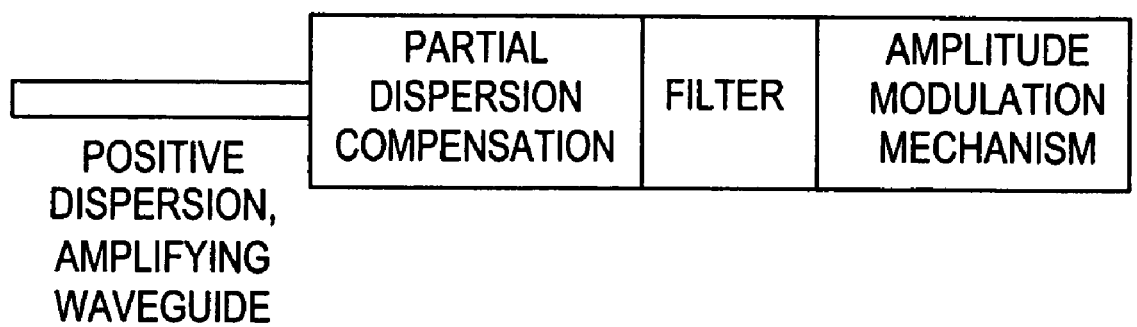
Figure 16:
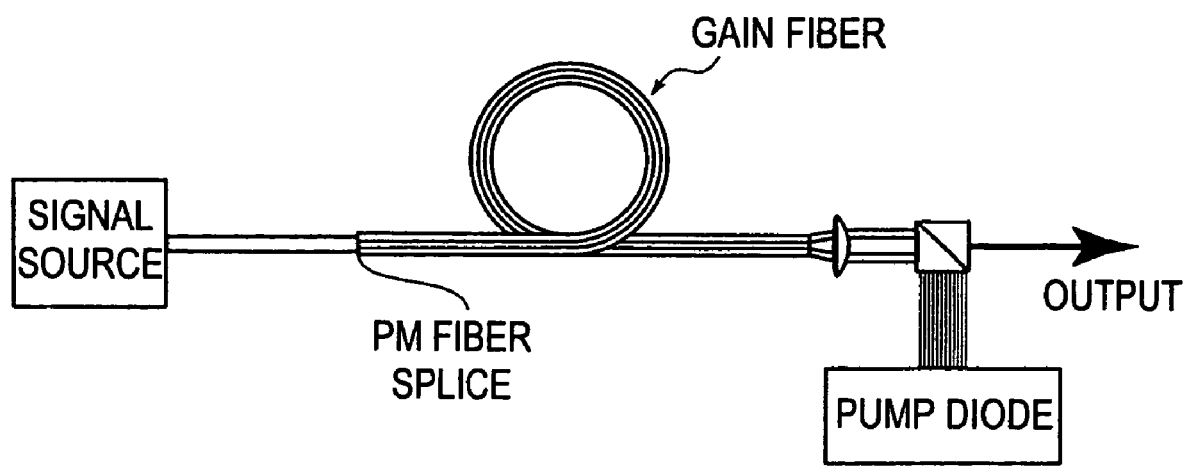

FIG. 14 compares the filter transmission spectrum with the output pulse spectrum, for the laser of FIG. 11;

FIG. 15 is a generalized representation of a waveguide amplifier system operating in the positive dispersion regime; and FIG. 16 illustrates a generic example of a polarization-maintaining fiber laser system.

DETAILED DESCRIPTION OF THE PREFERRED EMBODIMENTS

Figure 1:
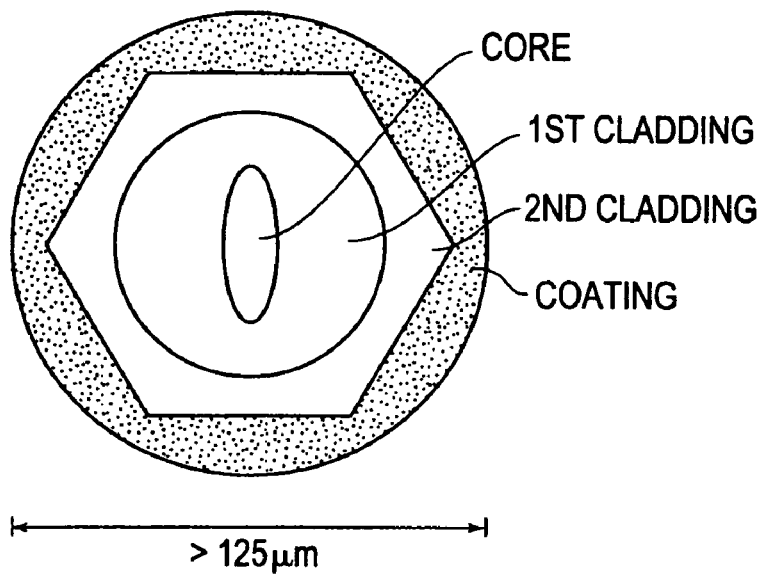

A schematic drawing of a polarization maintaining large-diameter fiber is shown in FIG. 1. The fiber core has an elliptical shape in order to define the polarization axes of the fiber. The fiber comprises a circular (or non-uniform) inner $1^{st}$ cladding and a non-uniform (or circular) outside $2^{nd}$ cladding. Here, the parentheses indicate that the locations of the circular and non-uniform claddings can be reversed. The refractive index of the $2^{nd}$ cladding is lower than the refractive index of the $1^{st}$ cladding. In principle any cladding shape can be used for the non-uniform cladding, whether the non-uniform cladding is the $1^{st}$ or the $2^{nd}$ cladding. The $1^{st}$ cladding can consist of germania-doped silica, whereas the $2^{nd}$ cladding can consist of fluoride glass to obtain a maximum refractive index difference, though any glass compositions with appropriate refractive index differences can be used.

Figure 2A:
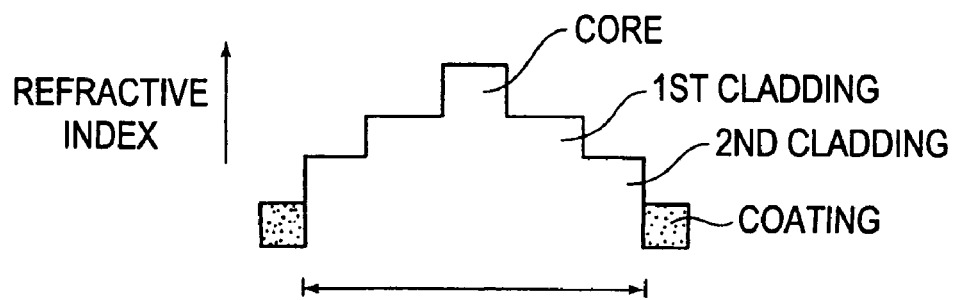
FIG. 2a illustrates a typical refractive index profile of a fiber according to the invention.

The fiber can be produced by starting out with a circular perform, which is then machined on both sides to produce an oblong structure. By heating and some additional stretching, the perform can be transferred back to a circular structure, producing a circular inner cladding, taking advantage of surface tension. As a result the fiber core will be elliptical, and the inner cladding will be circular A $2^{nd}$ cladding can then be produced by over-sleaving the circular fiber perform with a substrate tube of the appropriate $2^{nd}$ cladding material (fluoro or borosilicate) and subsequently fusing the tube to the original fiber perform. The $2^{nd}$ cladding can be machined to produce an arbitrary shape for the outside of the $2^{nd}$ cladding. A third cladding (coating) with a lower refractive index is then produced by coating the $2^{nd}$ cladding with an appropriate polymer material. The refractive index profile of such a fiber is shown in FIG. 2a.

Figure 2B:
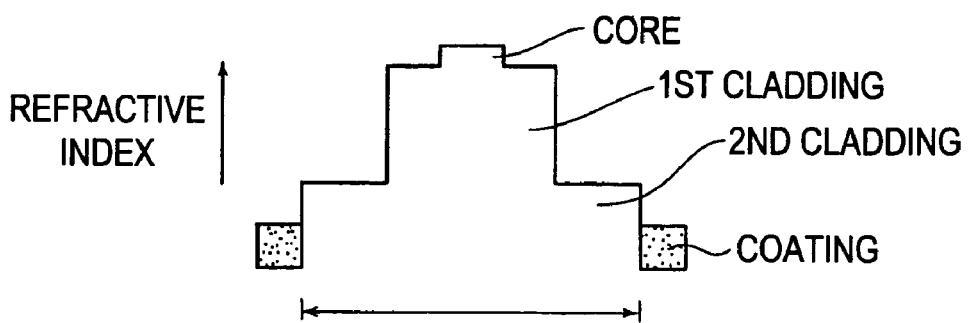
FIG. 2b illustrates a refractive index profile of a fiber formed by an alternative preform fabrication technique.

Alternatively, a $1^{st}$ cladding can be directly deposited around a heavily-germano, alumino-or phospho silicate doped fiber core during preform fabrication. This $1^{st}$ cladding is produced by reducing the doping level compared to the core. The cladding numerical aperture should be large (larger than 0.15) to enable coupling of large amounts of pump light and can have a circular or elliptical (not shown) cross-section. The outside cladding can then be made by appropriate machining of the preform substrate material, followed by coating as outlined above. The refractive index profile of such a fiber is shown in FIG. 2b.

Figure 3A:
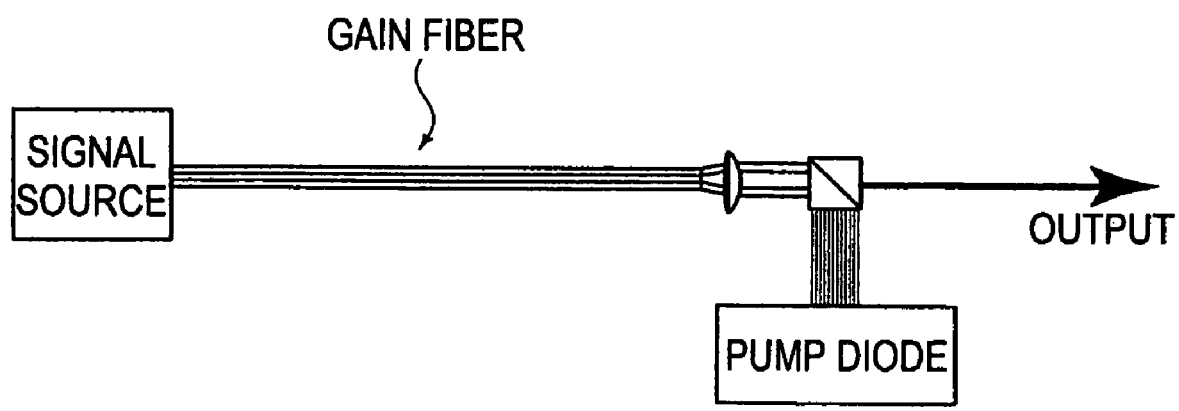
FIG. 3a illustrates a typical setup of a fiber laser according to the invention, employing output end pumping.
Figure 3B:
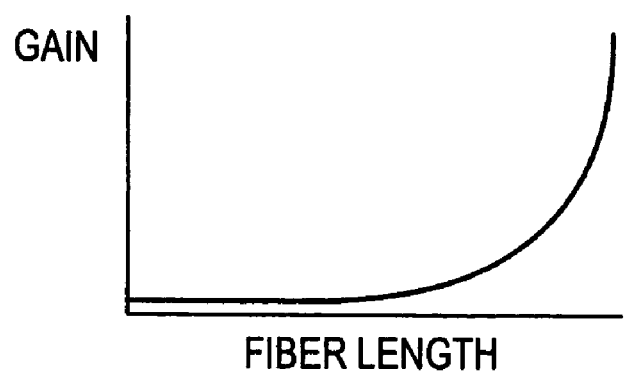

The central section of the fiber described in FIG. 1 or the fiber core can be doped with any rare-earth doping material so as to enable the use of the fiber as a polarization-holding amplifier. In this case the fiber design with a circular inner cladding as discussed above ensures a non-uniform absorption coefficient along the fiber length when end-pumping from the output end of a fiber amplifier is implemented as shown in FIG. 3a. Here, the signal light is injected from the left-hand side and the pump light is injected from the right-hand side, the output end of the fiber amplifier. Because of the reduced absorption of helical rays inside the inner cladding, the effective absorption coefficient of the pump light will decrease along the fiber. As a result the effective signal gain per unit length increases strongly towards the output end of the amplifier, producing a structure with a large gain only in the output end section of the amplifier as illustrated in FIG. 3b. Since the achievable peak power in a fiber amplifier of length L is generally inversely proportional to the effective amplifier length given by $L_{eff}=[1-\exp(-gL)]/g$ (for a constant gain g), a large gain at the end of an amplifier produces a short effective amplifier length and allows the generation of an optical signal with a correspondingly large peak power. A non-uniform second cladding, as well as scattering between the interface of the first and second claddings, provides efficient absorption for the light rays propagating in the second cladding.

Figure 4A:
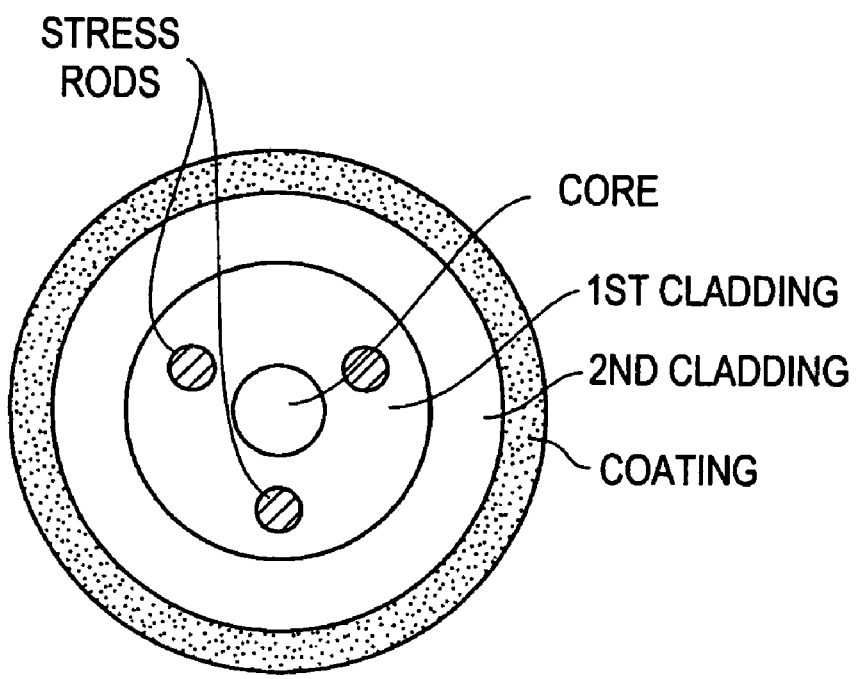
FIG. 4a illustrates a circular core fiber according to the invention, with stress rods incorporated into the first cladding.
Figure 4B:
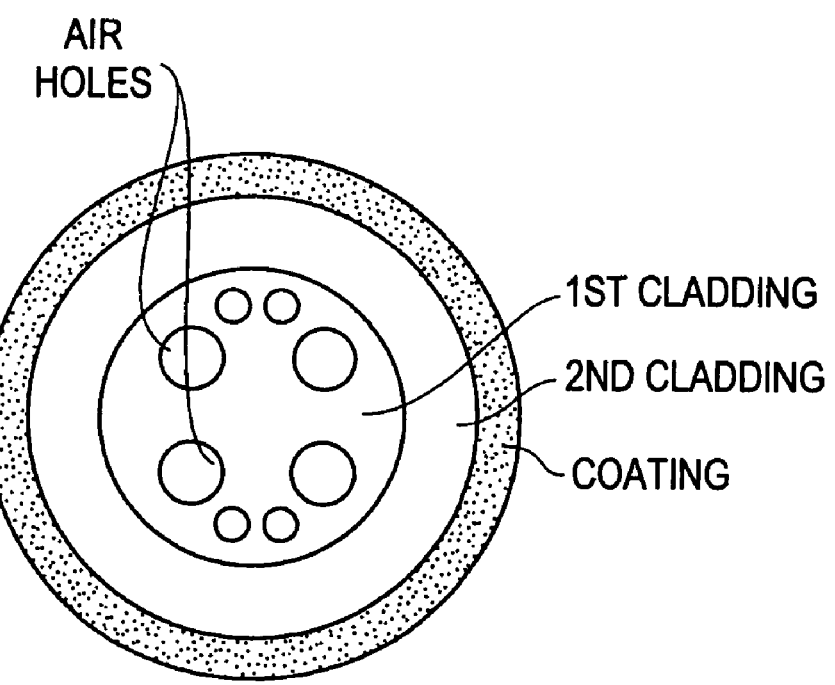
FIG. 4b illustrates an alternative to FIG. 4a, where air holes are incorporated into the first cladding for birefringence optimization.
Figure 5A:
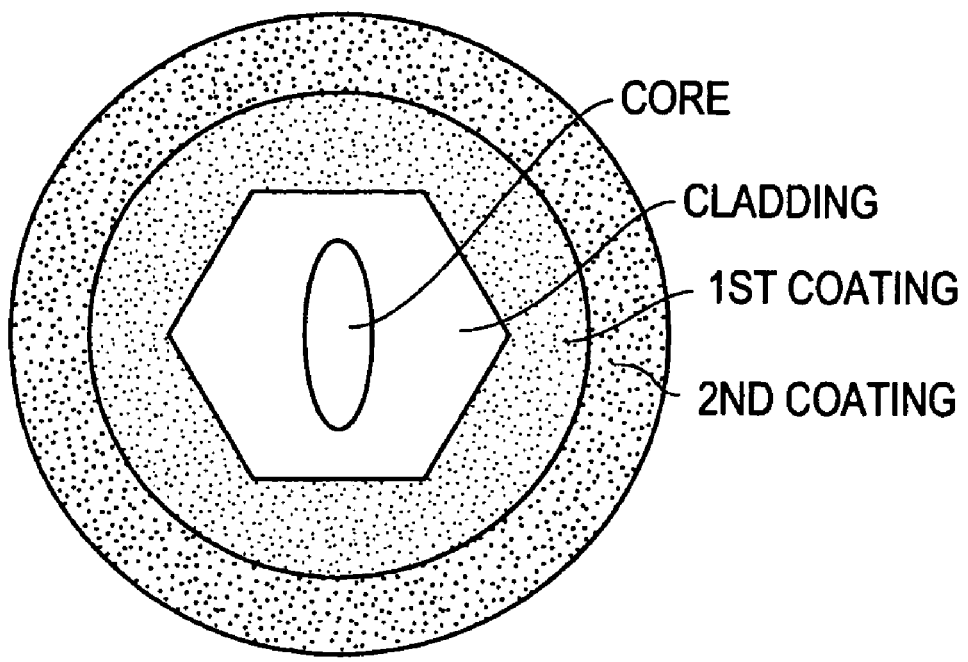
FIG. 5a illustrates an elliptical core embodiment of a fiber employing a soft inner coating and a hard outer coating.
Figure 5B:
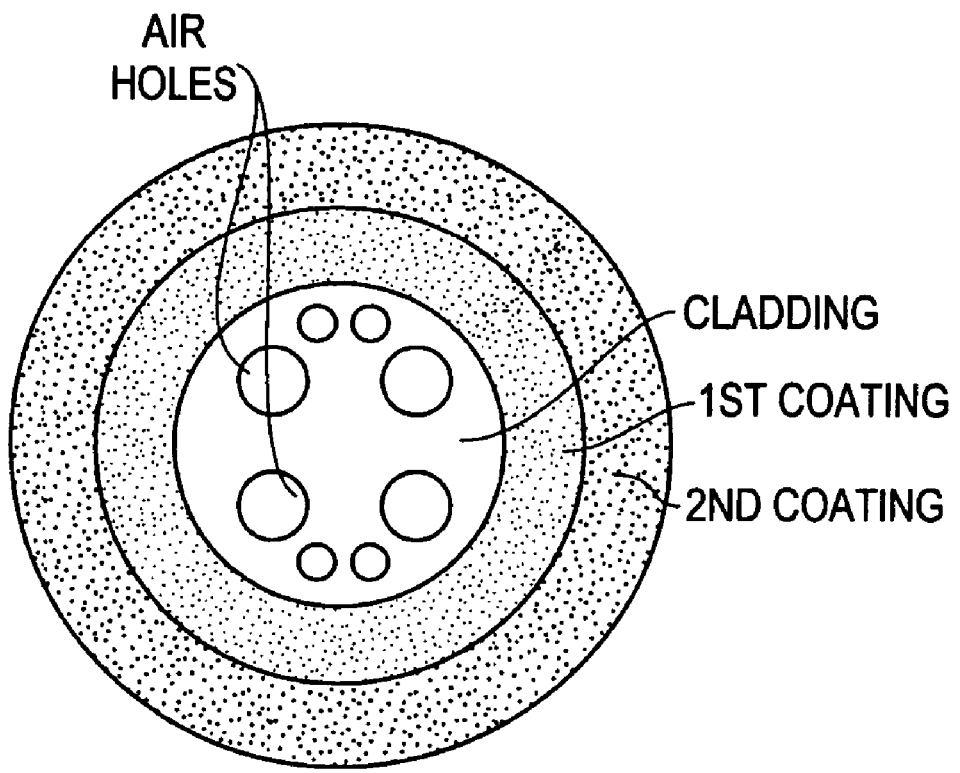
FIG. 5b illustrates a fiber similar to that of FIG. 5a, but employing a circular core surrounded by a cladding including air holes.

The $2^{nd}$ fiber cladding in FIG. 1 can be omitted, but the fiber should then have an outside diameter of >150 µm to minimize polarization mode-coupling in the fiber. The outside of the fiber can have an arbitrary shape. Optional stress producing regions (FIG. 4a) or selective fiber holes (FIG. 4b) can also be incorporated into the fiber cladding to obtain an optimum degree of birefringence as shown in FIGS. 4a and 4b. The stress producing regions within the inner cladding (or the air holes) can have different shapes as illustrated in FIG. 4b. In the absence of stress-producing regions or air holes, the ratio of the major/minor axis of the fiber core should be larger than 1.1. In the presence of stress-producing regions, a circular fiber core can be used. With or without the inclusion of a $2^{nd}$ cladding, the overall outside diameter of the fiber should be larger than 150 µm and the fiber birefringence should be larger than $1\times10^{-6}$. The outside of the fiber can be surrounded by a polymer coating for fiber protection. To increase the polarization holding ability of the fiber even further, a soft inner coating and a hard outer coating can be applied to the outside of the fiber. A possible selection of such coating materials is the use of a silicone inner coating and an acrylic outer coating. In this case an arbitrary fiber diameter can be used and a second cladding can be omitted. Two examples of such polarization holding fibers are shown in FIG. 5, where FIG. 5a comprises an elliptical core and FIG. 5b comprises a circular core surrounded by slightly asymmetric air holes. The central section of the fibers described in FIGS. 4 and 5 or the fiber core can be doped with any rare-earth doping material so as to enable the use of the fiber as a polarization holding amplifier.

The typical polarization holding ability of fibers of the design shown in FIG. 4a is listed in table 1 below. The fibers had approximately circular cores and all but fiber 1 incorporated stress-producing regions in the cladding. The fibers were 2 m long and were coiled onto spools with a diameter of 10 cm. The fibers were "double cladded", comprising a $1^{st}$ cladding and a low-index polymer coating. A true $2^{nd}$ cladding was absent. The fibers were doped with Yb with doping levels of about 2 mole %. The polarization extinction is the relative amount of light that couples into the $2^{nd}$ polarization axis (measured at the fiber output end) of the fiber when the light is coupled into the input end in the $1^{st}$ polarization axis of the fiber.

By comparing fibers 3 and 4, as well as by comparing fibers 5 and 6, it is clearly seen that the polarization extinction in the fibers is greatly improved for the same polarization beat length by simply increasing the outside fiber diameter. The variation in core diameter here is proportional to the overall fiber diameter and does not directly influence the polarization holding ability. Since polarization extinction is a measure of the polarization holding ability of the fiber, it can be seen that a small increase in fiber diameter can increase the polarization holding ability by one order of magnitude. This benefit holds for any amount of fiber birefringence, but is clearly most beneficial in an intermediate regime, where conventional fibers with an outside diameter of 125 µm do no allow for polarization maintaining operation for a given magnitude of birefringence. This intermediate regime encompasses birefringence values from $1\times10^{-6}\to1\times10^{-4}$. Herein, we refer to fibers with this range of birefringence as intermediate birefringence fibers. At a wavelength of 1 µm, the corresponding polarization beat lengths for the range of intermediate birefringence are between 100 cm and 1.0 cm, respectively.

TABLE 1 polarization extinction in fibers of different design.

| # | Fiber Stress | Fiber diameter (µm) | Fiber core diameter (µm) | Birefringence | Polarization beat length at 1.05 µm (cm) | Polarization extinction after 2 m of fiber | Mode-locking stability |
|---|---|---|---|---|---|---|---|
| 1 | No stress | 135 | 8 | $<1 \times 10^{-6}$ | Not applicable | | stable |
| 2 | Very low stress | 135 | 7 | $8 \times 10^{-6}$ | 13 | 20/1 | stable |
| 3 | Low Stress | 125 | 7 | $1.6 \times 10^{-5}$ | 6.5 | 100/1 | stable |
| 4 | Low Stress | 200 | 11 | $1.6 \times 10^{-5}$ | 6.5 | 1000/1 | stable |
| 5 | High Stress | 100 | 6 | $4.2 \times 10^{-5}$ | 2.5 | 100/1 | Not-stable |
| 6 | High Stress | 125 | 7.5 | $4.2 \times 10^{-5}$ | 2.5 | 1000/1 | Not-stable |

Figure 6A:
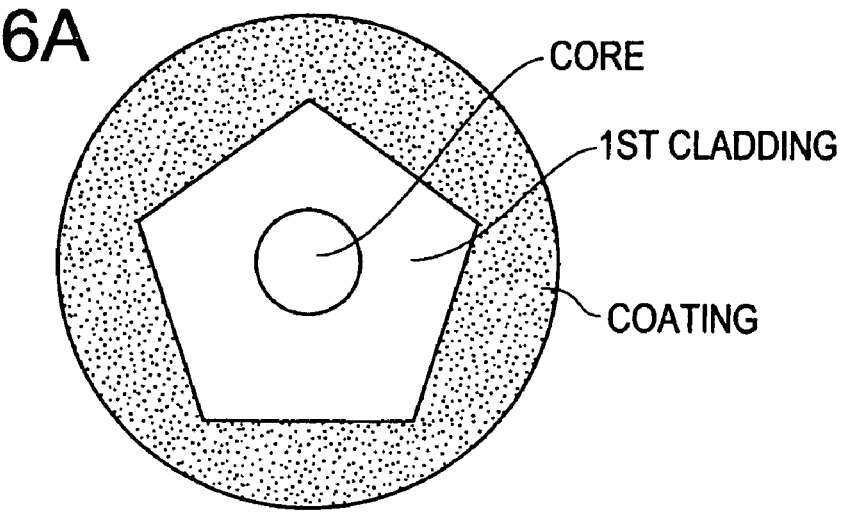
FIG. 6a illustrates a fiber with an inner cladding having an outer perimeter in the form of a pentagon surrounded by an outer cladding in the form of a polymer coating.

Efficient double-clad fibers can also be constructed by implementation of fibers with only one inner cladding and an outside cladding in the form of a polymer coating. In this case an inner cladding shape in the form of a pentagon can be implemented as shown in FIG. 6a. Here the core can be multi-mode or single-mode. Such a cladding shape has small internal angles optimizing pump mode coupling and optimizing pump absorption inside the fiber. A large pump absorption is clearly useful for application of such fibers as high-power pulse amplifiers.

Figure 6B:
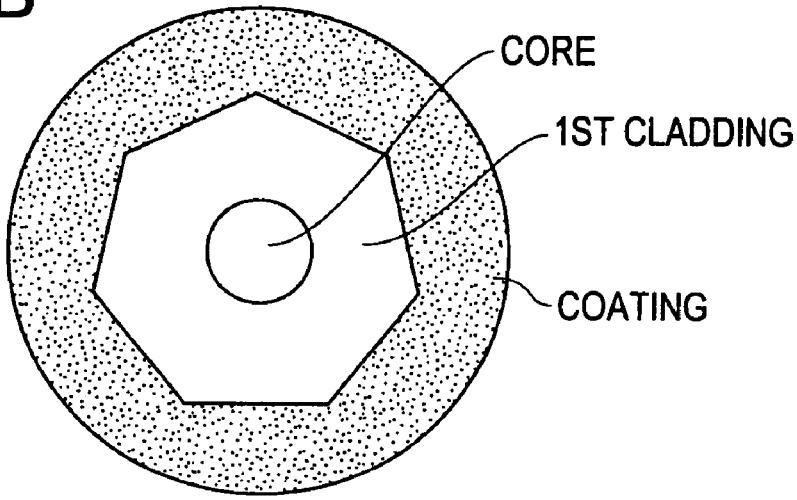
FIG. 6b illustrates a fiber with an inner cladding having an outer perimeter in the form of a heptagon and an outer cladding in the form of a polymer coating.

A cladding shape in the form of a heptagon is equally possible as shown in FIG. 6b. A heptagon produces less pump mode coupling because of the smaller internal angles between the cladding planes, however, because of the close proximity of such a structure to a perfect circle, such a fiber is easier to splice, which is preferable in many applications.

Note that these two cladding shapes are symmetrical, but they do not tile a plane. However, such claddings enable mode-coupling of the pump modes inside the fiber leading to efficient absorption of helical rays. Due to the resulting uniform pump absorption, such fibers would not necessarily be used to obtain the highest possible powers when used as amplifiers for high peak power pulses. Alternatively, a polygon with 9, sides or 11, or, generally, (2n–1), where n>4 sides can also be implemented (not shown).

Figure 6C:
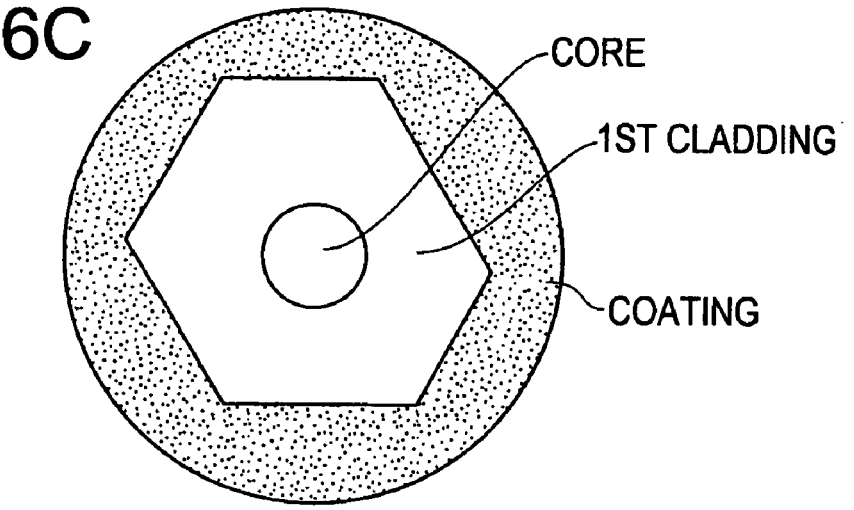
FIG. 6c illustrates a fiber with an inner cladding having an outer perimeter in the form of a non-diametrically-symmetric, non equilateral hexagon, that is, a hexagon with one side shortened, and an outer cladding in the form of a polymer coating.

Improved absorption of helical rays can also be obtained by using a non-diametrically symmetric, non-equilateral hexagonal cladding shape as shown in FIG. 6c. Because of the reduced level of symmetry of such a cladding shape, even better pump mode coupling is obtained leading to a maximization of pump mode absorption. Note that modifications to these cladding designs incorporating multiple coatings and a $2^{nd}$ non-circular inner cladding are also possible (not shown).

Figure 7A:
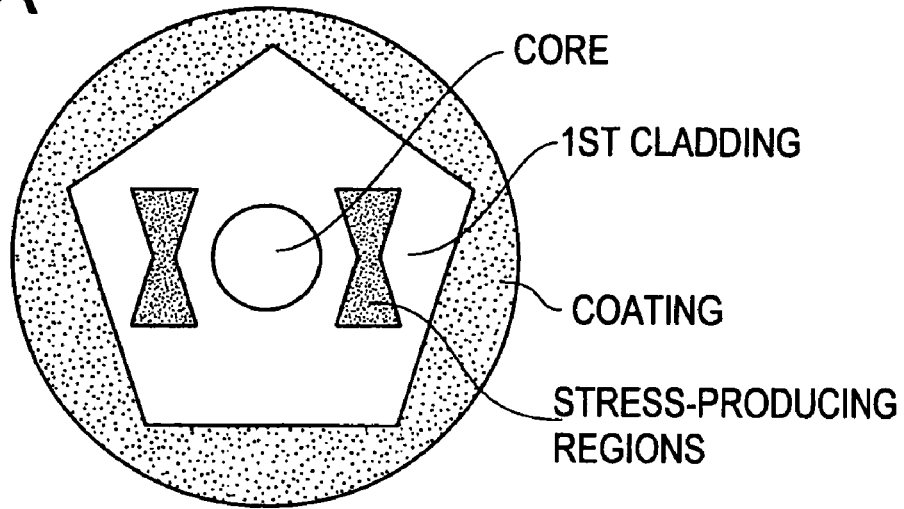
FIG. 7a illustrates a polarization maintaining fiber with an inner cladding having an outer perimeter in the form of a pentagon, incorporating non-circular stress producing regions and an outer cladding in the form of a polymer coating.
Figure 7B:
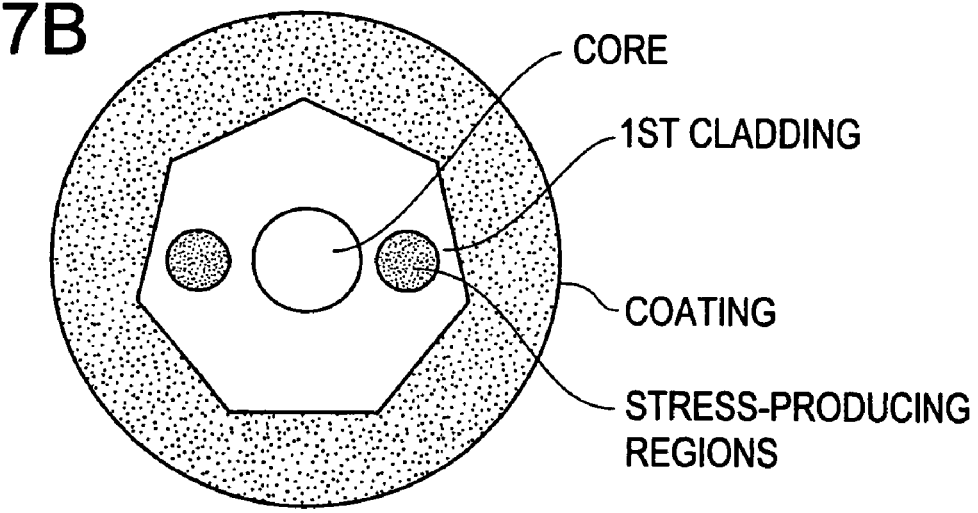
FIG. 7b illustrates a polarization maintaining fiber with an inner cladding having an outer perimeter in the form of a heptagon, incorporating circular stress producing regions and an outer cladding in the form of a polymer coating.
Figure 7C:
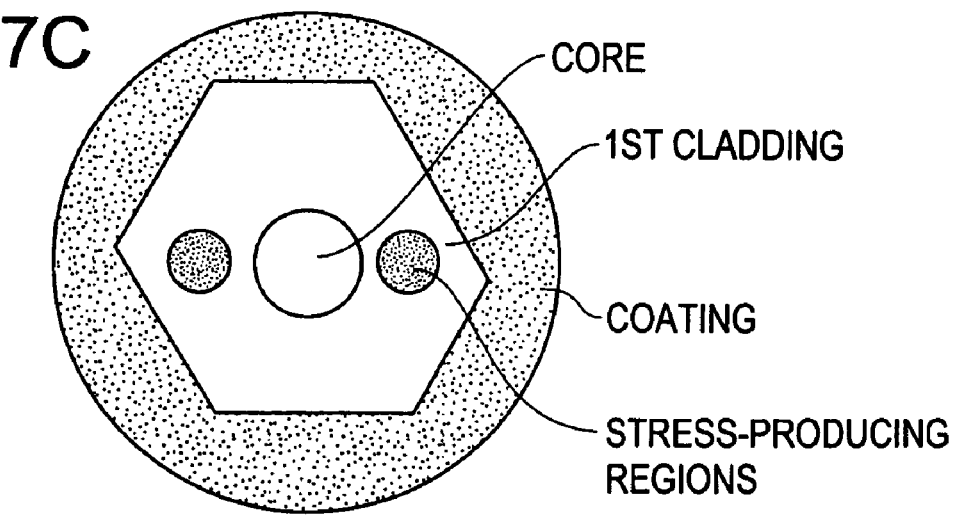
FIG. 7c illustrates a polarization maintaining fiber with an inner cladding having an outer perimeter in the form of a non-diametrically symmetric, non equilateral hexagon, that is, a hexagon with one side shortened, incorporating circular stress producing regions and an outer cladding in the form of a polymer coating.

To enable polarization maintaining operation of the fiber designs shown in FIG. 7, non-circular stress producing regions can be added. For example non-circular (or circular) stress producing regions can be added to the fiber cross section from FIG. 6a, as shown in FIG. 7a. Circular stress producing regions in conjunction with a pentagon fiber are not separately shown. Such fibers can have a single-mode or a multi-mode core. Circular stress producing regions are shown in conjunction with a heptagon fiber in FIG. 7b. Generally, circular stress production can be incorporated into any double-clad or triple clad fiber, where both the 1$^{st}$ inner and/or the 2$^{nd}$ inner cladding can be non-uniform. FIG. 7c is an additional implementation of a polarization maintaining fiber, incorporating a diametrically symmetric, non-equilateral hexagonal cladding shape.

In each of the forms of the invention in FIGS. 6 and 7, the fiber core may be multi-mode or single-mode.

Figure 8:
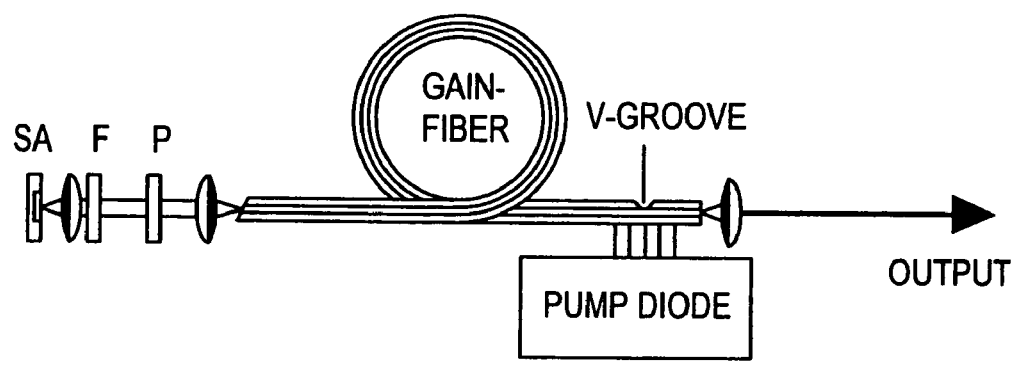
FIG. 8 illustrates a side pumped mode-locked fiber amplifier, which may include a multimode core.

The fibers listed in table 1 were also tested as part of a cavity of a passively modelocked Yb fiber laser. The generalized illustration of the modelocked system of the invention is shown in FIG. 8. The fibers were side-pumped with spatially incoherent light from a high-power pump laser coupled into the cladding. The bandpass filter (F) had a spectral bandwidth of 3 nm centered at 1040 nm. The polarizer (P) was aligned with one of the polarization axes of the fiber. The saturable absorber was a film of AlInGaAs with a thickness of 0.64 µm and a band edge of 1040 nm deposited on a film of gold that was attached to a heat sink. The carrier life—time of the absorber was of the order of 1 ps. The 4% reflection from the straight-cleaved intra-cavity fiber end served as the output coupler mirror. For a fiber length of 2 m the laser produced pulses at a repetition rate of ≈50 MHz with average powers of 10-40 mW depending on the core size of the fiber. The generated pulse width was typically 2 ps.

However, only the fibers with low values of birefringence and correspondingly long beat lengths produced stable modelocking. The reason is that for small values of birefringence, the main signal propagating in the first polarization axis and any secondary signal propagating in the second polarization axis lock together producing a single coupled polarization state which can oscillate inside the cavity. When the birefringence of the fiber is too high, the main signal and the secondary signal tend to unlock leading to unstable and time-varying operation of the modelocking process. In order to obtain stable modelocked pulses in a single polarization state, a large polarization extinction for small values of birefringence is required, as enabled by the use of intermediate birefringence fibers with outside diameter >125 µm. Moreover, the use of fibers with diameters >125 µm makes them more rigid, also minimizing polarization mode-coupling in the presence of fiber bends, i.e. large diameter fibers enable coiling with a smaller loss of polarization extinction compared to smaller diameter fibers. To minimize polarization mode-coupling, two fiber claddings and/or two (or more) appropriately selected layers of coating material can also be implemented.

The cavity shown in FIG. 8 also produced stable pulses in multi-mode fiber with a core diameter of 11 µm (fiber # 4), which supported more than 1 transverse mode. To enable stable pulse operation a fiber taper was incorporated into the fiber near a fiber end as a mode-filter. The taper is not separately shown. By tapering the outside diameter from 200-100 µm, the core diameter is correspondingly tapered from 11 µm to 5.5 µm, allowing for single-mode operation. As a result the fundamental mode in the fiber could typically be excited with an efficiency of 99%. To ensure stable modelocking in this case, the life-time of the saturable absorber had to be shorter than the single-pass group delay between the fundamental and the next higher-order mode in the fiber. The reason is that the next higher-order mode couples a small pulse into the fundamental mode of the fiber at each end of the cavity. This small pulse gets time delayed with respect to the main pulse. However, the small pulse generates an injection signal for the growth of a second time-delayed pulse. After another pass, yet another time delayed pulse is generated and so on. The growth of any secondary pulses is prevented, however, if the secondary pulse is strongly absorbed by the saturable absorber, which requires that the saturable absorber life-time be shorter than the single-pass group delay between the fundamental and the next higher-order mode.

Generally, in the presence of spurious reflections inside the cavity, the saturable absorber life time should be smaller than the time delay between the spurious pulse (generated by the spurious reflection) and the main pulse in the cavity.

Figure 9:
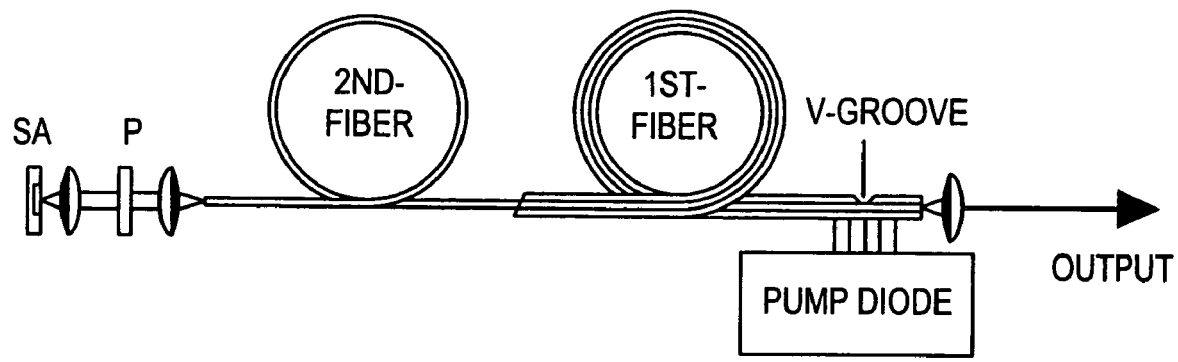
FIG. 9 illustrates application of the invention to a fiber laser including highly birefringent fiber sections in the cavity.

For example in FIG. 9 a modelocked fiber laser incorporating two sections of highly birefringent fiber inside a cavity is shown. The polarization axes of the fiber sections are assumed to be aligned parallel or anti-parallel with respect to each other. Due to small unavoidable misalignments of the polarization axes, small pulses propagating in the "wrong" polarization axis are thus generated at each connection between the fiber sections. Pulse stability hence requires that the single-pass group-delay between the polarization eigenmodes in each fiber section is larger than the generated pulse width. For example, assuming the fiber sections have polarization beat lengths of 3 mm at a wavelength of 1.55 µm and a corresponding birefringence of 5×10$^{-4}$, the polarization group delay is ≈3.5 ps in a 2 m fiber section. For fiber sections of 2 m length, the saturable absorber should thus have a life-time of less than 3.5 ps to ensure optimum stability of the modelocked laser.

Figure 10:
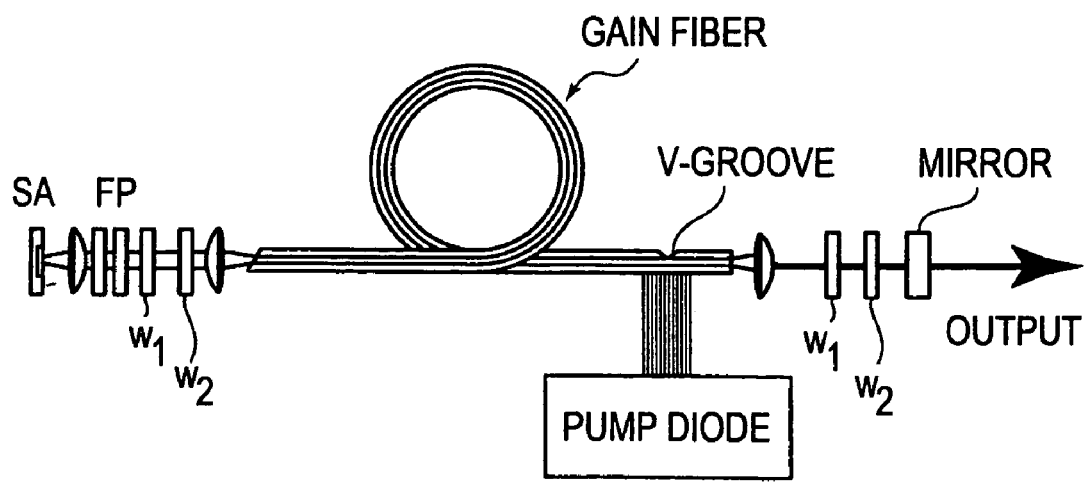
FIG. 10 illustrates application of the invention to a fiber laser including tension-coiled, approximately isotropic fiber.

The reduced degree of mode-coupling in multi-layer coated fibers or fibers with outside diameters >125 µm also allows an improvement in the polarization holding ability of isotropic tightly tension coiled fibers as suggested in Fermann et al., U.S. Pat. No. 6,072,811. Since such fibers are less sensitive to micro-bending induced mode-coupling, improved polarization extinction can be obtained. Such fibers can be used as a direct replacement of the intermediate or high birefringence fibers of FIG. 8. A modelocked fiber laser cavity incorporating a tension-coiled approximately isotropic fiber is displayed in FIG. 10. Here additional waveplates (w1, w2) are incorporated at each end of the cavity to make sure the polarization state is approximately linear inside the fiber coil for optimum laser stability.

End-pumping of a modelocked oscillator via a dichroic beamsplitter rather than side-pumping can also be employed as shown in FIG. 11. The gain fiber can incorporate intermediate birefringent, highly birefringent or multi-mode fiber. The straight-cleaved fiber end can be coated with a dielectric mirror in order to reduce the amount of output coupling. Alternatively, an external mirror could also be used as a an output coupler. Dispersion compensating elements (DC) such as one or two bulk grating pairs, prism pairs or grism pairs can also be incorporated into the cavity to produce shorter pulses and to simplify modelocked operation. In addition the saturable absorber mirror (SA) could be replaced with a standard mirror and an additional optical modulator could be incorporated into the cavity (not separately shown) to enable short pulse generation via active modelocking. An optical filter (F) can also be part of such a cavity.

Figure 12:
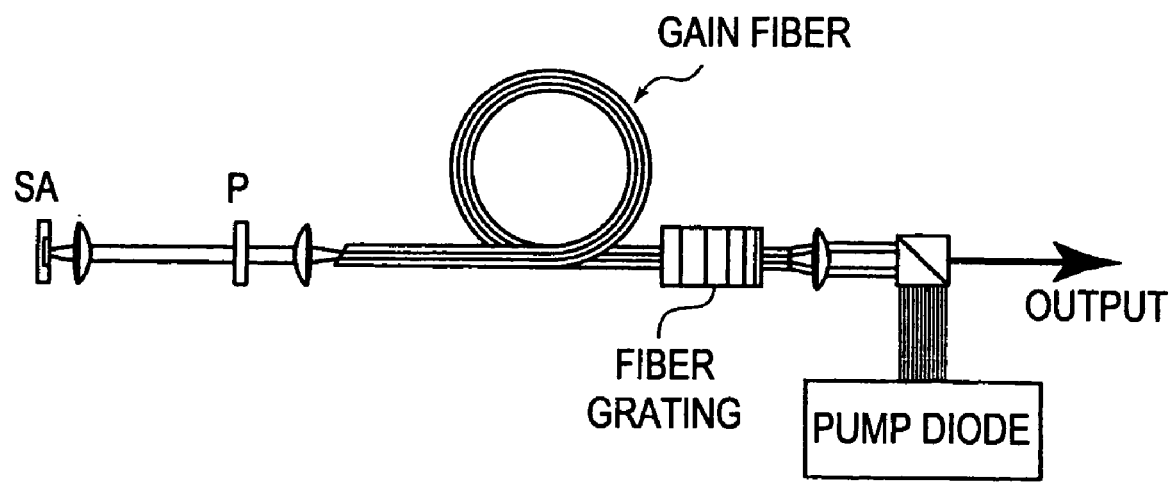
FIG. 12 illustrates an embodiment similar to FIG. 9, where the dispersion compensation is an in-fiber grating.

A modelocked oscillator can also be constructed using a fiber grating written directly into the gain fiber for further integration of the cavity components as shown in FIG. 12. Again, the gain fiber can incorporate intermediate birefringent, highly birefringent or multi-mode (MM) fiber. The grating can be chirped or unchirped depending on the desired output characteristics of the laser. If the pump light is injected from the saturable absorber fiber end or if a form of side-pumping is employed, an additional amplifier fiber could be spliced to the fiber grating end of the cavity for additional signal amplification, resulting in a very compact high-power fiber laser. Such a system configuration is not separately shown.

Figure 13:
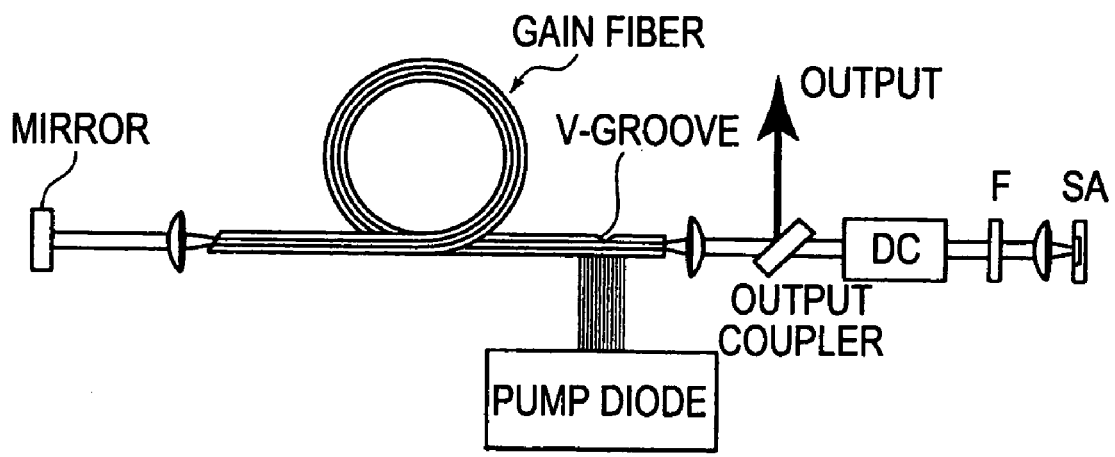
FIG. 13 illustrates an embodiment of a fiber laser where the bandwidth of the output is larger than that of an in-cavity filter, to enable parabolic pulse formation.

An embodiment of a modelocked high-power fiber laser is described with respect to FIG. 13. The incorporation of the dispersion compensating element (DC) is optional, however, the best system performance is obtained if the dispersion compensating element provides negative dispersion and compensates for about 50% of the total (positive) fiber dispersion. The filter (F) has a bandwidth (FWHM) less than the gain bandwidth (FWHM) of the fiber. For a Nd or Yb fiber laser, an optimum filter bandwidth is in the range from 1-30 nm. The gain fiber has positive dispersion. The fiber is polarization maintaining and intermediate birefringence and high birefringence fiber or MM fiber can be employed. The polarizer is aligned with one of the polarization axes of the fiber. The formation of parabolic pulses is then enabled when using a highly absorptive saturable absorber. The linear absorption of the saturable absorber is 90%. If the saturable absorber is also operated in deep saturation, the tendency of high-power pulses to break up inside the cavity is suppressed. As a result linearly chirped high-power parabolic pulses can be generated. Because parabolic pulses are relatively insensitive to self-phase modulation, the energy of parabolic pulses can be much higher compared to soliton and gaussian shaped pulses. A key parameter for obtaining parabolic pulses is a generated spectral bandwidth of the output pulses, which is larger than the intra-cavity filter bandwidth, a feature that is not achievable with other modelocking techniques. A typical example of the obtainable pulse spectrum in comparison to the intra-cavity filter bandwidth for a modelocked Yb oscillator is shown in FIG. 14. The increased spectral bandwidth in comparison to the intra-cavity filter bandwidth is an ideal measure of the degree by which the intra-cavity pulses have acquired a parabolic pulse shape. The generation of high power parabolic pulses is not limited to Fabry-Perot cavities as shown, but any waveguide laser cavity design with an intra-cavity positive dispersion amplifier waveguide and a narrow bandpass filter can be implemented. Whenever the pulse bandwidth exceeds the intra-cavity filter bandwidth, the formation of approximately parabolically shaped pulses occurs. Optimum stability for parabolic pulse formation is ensured when the life-time of the absorber is shorter than 5 times the maximum width of the generated pulses, where a saturable absorber life-time of less than 1 times the width of the generated pulses is preferred.

In the specific design example of a parabolic pulse oscillator shown in FIG. 13, the intra-cavity Yb fiber length was 4 m, the optical filter had a bandwidth of 10 nm, the non-saturated loss of the absorber was 90% and the saturable absorber was located at the intra-cavity end that comprised the dispersion-compensating elements. The saturable absorber had a life-time of 4 ps. The dispersion compensating element was adjusted to compensate for 50% of the positive fiber dispersion. The output coupling mirror had a reflectivity of 80% at the signal wavelength of 1.05 μm. The laser produced pulses with an average power up to 500 mW, corresponding to a pulse energy of 20 nJ. The pulses were approximately linearly chirped and were recompressible to approximately the bandwidth limit with another set of dispersion-compensating elements (not shown).

The above system is a representation of a generic optical system operating in the positive dispersion regime comprising a unit having a positive dispersion amplifying waveguide, partial dispersion compensation, an optical bandpass filter and an amplitude modulation mechanism as shown in FIG. 15. In general, partial dispersion compensation, the filtering function as well as the amplitude modulation functions can also be provided by waveguide elements. Such an optical system can be part of a Fabry-Perot laser cavity, a ring-laser cavity or can also be part of a long-distance optical transmission system as used in telecommunications.

Polarization maintaining intermediate birefringence fibers can also be used in other fiber laser or amplifier applications. A generic example of such a fiber as a polarization maintaining amplifier is shown in FIG. 16. In this example the signal light is coupled into the PM amplifier via a polarization maintaining fiber and polarization maintaining fiber splice. Such a splice can be accomplished by rotating the two fibers appropriately before splicing. The amplifier can be end-pumped or side pumped. The pump light can also be injected via optical couplers located at either end of the amplifier fiber or anywhere within the amplifier fiber.

Other modifications and variations to the invention will be apparent to those skilled in the art from the foregoing disclosure and teachings, and it is intended that the invention be measured solely by the claims which follow.

What is claimed is:

1. A passively modelocked fiber laser comprising:
    a laser cavity having an intra-cavity dispersion for generating a substantially linearly chirped pulse within at least a portion of said cavity; and
    a rare-earth doped gain fiber, wherein said modelocked laser is operable to produce an intra-cavity self-phase modulation value substantially greater than pi.

2. A passively modelocked fiber laser as claimed in claim 1 wherein said linearly chirped pulse comprises a parabolic pulse.

3. A passively modelocked fiber laser as claimed in claim 1, wherein said rare-earth doped gain fiber resides within said cavity; and further comprising:
    an intra-cavity optical filter, wherein an output of said fiber laser has a larger spectral bandwidth than a bandwidth of said intra-cavity filter.

4. The passively modelocked fiber laser as claimed in claim 1, wherein said fiber laser comprises a ring cavity.

5. A passively modelocked fiber laser generating short optical pulses, comprising:
    a laser cavity having intra-cavity dispersion; and
    a rare-earth-doped gain medium within the cavity, said gain medium having a positive dispersion and operable to produce an intra-cavity self-phase modulation value substantially greater than pi, wherein a pulse bandwidth of intra-cavity optical pulses is substantially changed during propagation through the cavity.

6. The passively modelocked fiber laser as claimed in claim 5, wherein said laser cavity comprises at least one element having a negative dispersion that partially compensates said positive dispersion of said gain medium, wherein said gain medium and said at least one element produces a positive intra-cavity dispersion.

7. The passively modelocked fiber laser as claimed in claim 6, wherein said cavity comprises a dispersion compensator compensating for about 50% of a positive dispersion of said rare-earth doped gain medium.

8. The passively modelocked fiber laser as claimed in claim 5, further comprising an optical filter.

9. The passively modelocked fiber laser as claimed in claim 5, wherein said rare-earth-doped medium comprises an optical fiber having an outside diameter greater than about 125 microns.

10. The passively modelocked fiber laser as claimed in claim 5, wherein said rare-earth-doped medium comprises a cladding pumped optical fiber having an outside diameter greater than about 125 microns.

11. A passively modelocked fiber laser generating short, high peak-power, optical pulses, comprising:

a laser cavity having intra-cavity dispersion, said cavity comprising: an optical filter having a bandwidth in the range of about 1-30 nm; a partial dispersion compensation mechanism, a saturable absorber having a life-time less than about 3.5 picoseconds; and an amplitude modulation mechanism comprising an optical modulator;

a rare-earth-doped gain fiber within the cavity, said rare-earth-doped fiber being polarization maintaining (PM) and one or both of birefringent and multi-mode, said PM optical fiber having an outside diameter greater than about 125 microns, said gain fiber having a positive dispersion and operable to produce an intra-cavity self-phase modulation value substantially greater than pi, wherein a pulse bandwidth of intra-cavity optical pulses is substantially broadened during propagation through the cavity so as to produce substantially linearly chirped optical pulses with a bandwidth larger than a bandwidth of any intra-cavity bandwidth-limiting optics, wherein said dispersion compensating mechanism comprises at least one element having a negative dispersion that partially compensates said positive dispersion of said gain medium such that said gain medium and said at least one element produce a net-positive intra-cavity dispersion, and wherein an output of said passively modelocked fiber laser is temporally compressible to approximately the bandwidth limit corresponding to the spectral bandwidth of said laser output;

at least one optical pump source, each source comprising at least one laser diode, said at least one pump source configured for cladding pumping of said gain fiber.

12. A passively modelocked fiber laser generating short optical pulses, comprising:
a laser cavity configured to form parabolic pulses, said cavity comprising a rare-earth-doped gain medium comprising an optical gain fiber, wherein a spectral bandwidth of said pulses is greater than a gain bandwidth of said gain medium.

13. A passively modelocked fiber laser for generating short optical pulses, comprising:
a laser cavity comprising a gain medium having a rare-earth doped gain fiber, and having an intra-cavity dispersion for generating substantially linearly chirped pulses within at least a portion of said cavity, wherein said linearly chirped pulses comprise parabolic pulses.

14. A passively modelocked fiber laser as claimed in claim 13, wherein a spectral bandwidth of said optical pulses is greater than a gain bandwidth of said gain medium.

15. A passively modelocked fiber laser as claimed in claim 13, further including a saturable absorber at an end of said cavity, said saturable absorber having a lifetime shorter than about 5 times the width of said optical pulses.

16. A passively modelocked fiber laser as claimed in claim 13, further including an output coupler for said optical pulses.

17. A passively modelocked fiber laser as claimed in claim 16, wherein said output coupler is a fiber grating.

18. A passively modelocked fiber laser as claimed in claim 17, further including a fiber amplifier spliced onto said fiber grating.

19. A passively modelocked fiber laser according to claim 13, where said cavity dispersion is positive.

20. A passively modelocked fiber laser according to claim 13, where said cavity contains positive dispersion fiber.

21. A passively modelocked fiber laser according to claim 13, said modelocked fiber laser further containing means for dispersion compensation of said laser cavity.

22. A passively modelocked fiber laser according to claim 21, said dispersion compensation means being selected to produce a positive cavity dispersion.

23. A passively modelocked fiber laser according to claim 13, where an output of the fiber laser comprises a substantially linearly chirped parabolic pulse.

24. A passively modelocked fiber laser according to claim 13, where said gain fiber is doped with Yb, Nd, Er, Tm or combinations thereof.

25. A passively modelocked fiber laser according to claim 13, where an output of said laser can be temporally compressed to approximately the bandwidth limit corresponding to the spectral bandwidth of said laser output.

26. A passively modelocked fiber laser according to claim 13, wherein said laser produces optical pulses with a bandwidth larger than a bandwidth of any intra-cavity bandwidth-limiting optics.

27. A passively modelocked fiber laser according to claim 13, said cavity further containing an amplitude modulation mechanism.

28. A passively modelocked fiber laser according to claim 27, said amplitude modulation mechanism comprising an optical modulator.

29. A passively modelocked fiber laser according to claim 13, said cavity further containing a sequential arrangement of a positive dispersion amplifying waveguide, a partial dispersion compensation mechanism and an amplitude modulation mechanism.

30. A passively modelocked fiber laser according to claim 13, said cavity further containing a saturable absorber having a life-time less than about 3.5 picoseconds.

31. A passively modelocked fiber laser according to claim 13, said cavity further containing fiber which is one or both of birefringent and multi-mode.

32. A passively modelocked fiber laser as claimed in claim 31, said fiber having at least one air hole located therein.

33. A passively modelocked fiber laser as claimed in claim 31, said fiber having a plurality of said air holes arranged in a symmetric or asymmetric pattern.

34. A passively modelocked fiber laser as claimed in claim 33, wherein said fiber is a highly birefringent photonic crystal fiber.

35. A passively modelocked fiber laser as claimed in claim 33, wherein said fiber is doped with a rare earth doping material.

36. A passively modelocked fiber laser generating short optical pulses as claimed in claim 13, wherein a pulse bandwidth of intra-cavity optical pulses is substantially changed on propagation through the cavity.

37. A passively modelocked fiber laser generating short optical pulses as claimed in claim 21, wherein said dispersion compensation means comprises one or more of grisms, chirped fiber Bragg gratings, prisms, and bulk gratings.

38. A passively modelocked fiber laser generating short optical pulses as claimed in claim 13, wherein said modelocked laser is operable to produce an intra-cavity self-phase modulation value substantially greater than pi.

39. The passively modelocked fiber laser as claimed in claim 12, wherein said fiber laser comprises a ring cavity.

40. The fiber laser as claimed in claim 12, wherein an output of said passively modelocked fiber laser is compressible to a bandwidth limit corresponding to the spectral bandwidth of said passively modelocked fiber laser output.

41. The fiber laser system as claimed in claim 12, wherein said passively modelocked fiber laser comprises a dispersion compensating mechanism, said mechanism comprising at least one element having a negative dispersion that partially compensates said positive dispersion of said cavity and produces a net-positive cavity dispersion.

42. The fiber laser system as claimed in claim 12, wherein a pulse bandwidth of intra-cavity optical pulses is substantially broadened during propagation through the cavity so as to produce said substantially linearly chirped optical pulses with a bandwidth larger than a bandwidth of any intra-cavity bandwidth-limiting optics.

43. A passively modelocked fiber laser comprising:
a laser cavity having a positive cavity dispersion, said laser cavity having an intra-cavity self-phase modulation value greater than pi;
a rare earth doped gain fiber in said cavity; and
an optical filter having a bandwidth in the range from about 1 nm to about 30 nm, wherein said passively modelocked fiber laser generates substantially linearly chirped optical pulses.

44. A fiber laser system for generating short pulses, comprising:
a passively modelocked short pulse fiber laser as claimed in claim 43; and
a fiber amplifier disposed downstream from said passively modelocked short pulse fiber laser, said fiber amplifier receiving an output from said passively modelocked fiber laser.

45. The fiber laser as claimed in claim 44, wherein an output of said passively modelocked fiber laser is compressible to a bandwidth limit corresponding to the spectral bandwidth of said passively modelocked fiber laser output.

46. The fiber laser system as claimed in claim 44, wherein said linearly chirped pulses comprise parabolic pulses.

47. The fiber laser system as claimed in claim 44, wherein said passively modelocked fiber laser comprises a dispersion compensating mechanism, said mechanism comprising at least one element having a negative dispersion that partially compensates said positive dispersion of said cavity and produces a net-positive cavity dispersion.

48. The fiber laser system as claimed in claim 44, wherein a pulse bandwidth of intra-cavity optical pulses is substantially broadened during propagation through the cavity so as to produce said substantially linearly chirped optical pulses with a bandwidth larger than a bandwidth of any intra-cavity bandwidth-limiting optics.

49. The fiber laser system as claimed in claim 44, wherein said linearly chirped pulses comprise parabolic pulses.

* * * * *